United States Patent

[11] 3,607,220

[72] Inventors Aart Antonie vanderGiessen;
Cornelis Johannes Klomp, both of
Emmasingel, Eindhoven, Netherlands
[21] Appl. No. 802,680
[22] Filed Feb. 26, 1969
[45] Patented Sept. 21, 1971
[73] Assignee U.S. Philips Corporation
New York, N.Y.
[32] Priority Mar. 5, 1968
[33] Netherlands
[31] 6803122

[54] METHOD OF PREPARING A MAGNETICALLY STABLE POWDER CONSISTING MAINLY OF IRON FOR MAGNETIC RECORDING
3 Claims, No Drawings

[52] U.S. Cl. .......... 75/0.5 AA
[51] Int. Cl. .......... B22f 9/00
[50] Field of Search .......... 75/0.5 AA, 0.5 BA

[56] References Cited

UNITED STATES PATENTS

| | | | |
|---|---|---|---|
| 2,660,522 | 11/1953 | Marquaire | 75/0.5 AA |
| 2,879,154 | 3/1959 | Campbell | 75/0.5 BA |

*Primary Examiner*—L. Dewayne Rutledge
*Assistant Examiner*—W. W. Stallard
*Attorney*—Frank R. Trifari

ABSTRACT: Iron powder suitable for use as a magnetic recording medium is prepared by first subjecting a finely divided iron oxide or oxyhydrate such as $\alpha$-$Fe_2O_3$, $\gamma$-$Fe_2O_3$, $\alpha$-FeOOH, $\gamma$-FeOOH or $Fe_3O_4$ to the action of a 0.002 to 1 molar solution in water of stannous chloride and thereafter reducing the iron oxide or oxyhydrate, preferably in hydrogen, followed by stabilizing the iron powder thus obtained.

METHOD OF PREPARING A MAGNETICALLY STABLE POWDER CONSISTING MAINLY OF IRON FOR MAGNETIC RECORDING

The invention relates to a method of preparing a magnetically stable powder consisting mainly of iron for magnetic recording. A "magnetically stable powder" is to be understood to mean herein a powder of which the saturation magnetization, after the powder has been exposed to atmospheric air for 24 hours, still is at least 90 percent of the value measured immediately after the preparation of the powder. Such magnetically stable powders are obtained by "-stabilizing" the freshly prepared powders, namely by immersing them in a suitably chosen organic liquid, for example, dioxane, acetone or ethanol, then taking them out of the liquid and removing the adhering liquid.

Fine iron powders as a material for magnetic recording are known. It was already suggested to prepare such powders by electrolysis of ferrous salt solutions while using a mercury cathode. The cost involved in the use of this method on a technical scale is considerable. On the other hand it has been found that iron powders prepared by reduction of finely divided iron oxide or finely divided iron oxide hydrate with a gaseous reduction agent, for example, hydrogen, are not very suitable for use as a material for magnetic recording. It is the object of the invention to improve this.

According to the invention, the finely divided iron oxide or iron oxide hydrate, before being reduced with a gaseous reduction agent, is first treated with a 0.002 to 1 molar solution in water of stannous chloride, $SnCl_2$.

As a gaseous reduction agent hydrogen is to be considered first of all. Carbon monoxide may also be used as such. The finely divided iron oxide or iron oxide hydrate is preferably kept immersed for some time, for example, in the solution of stannous chloride, the contact between the solid and the liquid being promoted by shaking and/or stirring. The solid is then separated from the liquid, for example, by centrifuging or filtering. If required, the solid is then washed with a volatile water-miscible organic liquid, for example, acetone, and dried in air.

Very good results were obtained by treating the iron oxide or iron oxide hydrate with a 0.004 to 0.04 molar solution of stannous chloride in water. In order to prevent hydrolysis of the stannous chloride, it is efficacious to add a little hydrochloric acid to the solution.

In order that the invention may be readily carried into effect, one example thereof will now be described in a greater detail.

EXAMPLE

The following iron oxide, (hydrate), powders were available:

1. A powder of $\alpha$-FeO·OH with acicular parts, approximately 1 micron long and approximately 0.2 micron thick ("oxide powder 1").
2. A powder of $\alpha$-FeO·OH having particles of the same shape and dimensions as that of "oxide powder 1" but of a different origin ("oxide powder 2").
3. A powder of $\gamma$-FeO·OH having particles of the same shape and dimensions as that of "oxide powder 1" and "oxide powder 2" ("oxide powder 3").
4. A powder of $\alpha$-$Fe_2O_3$ having particles of the same shape and dimensions as that of the above-mentioned oxide powders ("oxide powder 4").
5. A powder of $\gamma$-$Fe_2O_3$ having particles of the same shape and dimensions as that of the above-mentioned oxide powders ("oxide powder 5").
6. A powder of $Fe_3O_4$ having particles of the same shape and dimensions as that of the above-described powders, ("oxide powder 6").
7. A powder of $\alpha$-$Fe_2O_3$ having hexagonal dipyramidal particles of approximately 0.1 micron ("oxide powder 7").

Hydrogen, at a rate of 940 ml. per minute, is led over 150 mg. of each of the above powders at a temperature of 350° C. for one hour. The resulting iron powders are stabilized by immersing them in dioxane for 30 minutes, then separating them from the dioxane, and finally drying them in air.

The characteristic quantities which are most important for the usefulness of the resulting iron powders as a material for magnetic recording have been measured, namely:

$/\mu_o$ the magnetic permeability (ratio B/H, where B is the magnetic flux density in v.-sec./m.$^2$ and H is the magnetic field strength in a./m.), in vacuo);

$I_Hc$ the magnetizing coercive force; and $\sigma_r$ , the remanent magnetic moment per kgm after magnetization in a field of $10^6$ a./m.

In addition the following solutions were prepared.

a. a solution of 0.004 molar $SnCl_2$ in demineralized water to which a little hydrochloric acid is also added to prevent hydrolysis (solution "Sn-0.004").

b. a solution of 0.04 molar $SnCl_2$ in demineralized water to which a little hydrochloric acid is also added (solution "Sn–0.04").

c. a solution of 0.4 molar $SnCl_2$ in demineralized water, also containing a little hydrochlorid acid (solution Sn–0.4").

A quantity of 5 g. of each of the above-mentioned iron oxide (hydrate) powders is pretreated with one of the above-mentioned solutions and that in the following manner.

The powder is added to a quantity of approximately 200 to 230 ml. of one of the above-mentioned solutions contained in a bottle having a capacity of approximately 300 ml. The powder is left in contact with the solution for approximately 3 hours, the closed bottle being vigorously shaken with intervals of approximately 30 minutes. The powder is then separated from the solution by centrifuging.

The powder is then stirred in approximately 100 ml. of acetone and again separated from the acetone by centrifuging which two treatments (stirring in acetone and centrifuging) are repeated another two times. The powder is finally dried in air.

The thus pretreated iron oxide (hydrate) powders are converted into stabilized iron powders in the same manner as described above with reference to the nonpretreated iron oxide (hydrate) powders. The characteristic quantities of these iron powders which are most important for the above-mentioned usefulness of the powders as a material for magnetic recording were measured of these powders also.

The results of the measurements are recorded in the tables A to G below.

TABLE A

| Iron powder prepared from "oxide powder 1" which was pretreated with solution | $(\mu_0 \cdot {}_IH_c)\times10^4$ (in v. sec./m.$^2$) | $\sigma_r\times10^4$ (in v. sec. m./kg.) |
|---|---|---|
| | 445 | 0.64 |
| "Sn–0.004" | 758 | 0.71 |
| "Sn–0.04" | 705 | 0.74 |
| "Sn–0.4" | 608 | 0.65 |

TABLE B

| Iron powder prepared from "oxide powder 1" which was pretreated with solution | $(\mu_0 \cdot {}_IH_c)\times10^4$ (in v. sec./m.$^2$) | $\sigma_r\times10^4$ (in v. sec. m./kg.) |
|---|---|---|
| | 638 | 0.69 |
| "Sn–0.04" | 800 | 0.74 |
| "Sn–0.4" | 520 | 0.58 |

TABLE C

| Iron powder prepared from "oxide powder 1" which was pretreated with solution | $(\mu_o \cdot {}_iH_c)\times 10^4$ (in v. sec./m.$^2$) | $\sigma_r \times 10^4$ (in v. sec. m./kg.) |
|---|---|---|
| | 440 | 0.73 |
| "Sn-0.04" | 785 | 0.80 |
| "Sn-0.4" | 545 | 0.58 |

TABLE D

| Iron powder prepared from "oxide powder 1" which was pretreated with solution | $(\mu_o \cdot {}_iH_c)\times 10^4$ (in v. sec./m.$^2$) | $\sigma_r \times 10^4$ (in v. sec. m./kg.) |
|---|---|---|
| | 450 | 0.65 |
| "Sn-0.04" | 805 | 0.76 |
| "Sn-0.4" | 575 | 0.65 |

TABLE E

| Iron powder prepared from "oxide powder 1" which was pretreated with solution | $(\mu_o \cdot {}_iH_c)\times 10^4$ (in v. sec./m.$^2$) | $\sigma_r \times 10^4$ (in v. sec. m./kg.) |
|---|---|---|
| | 725 | 0.83 |
| "Sn-0.04" | 945 | 0.92 |
| "Sn-0.4" | 885 | 0.84 |

It may be seen from the tables that as a result of the pretreatment of the iron oxide or iron oxide hydrate compositions from which iron powder compositions are obtained by reduction, the suitability of these iron powder compositions for use as a material for magnetic recording is considerably improved. Actually, the coercive force and usually also the remanence of the iron powder composition prepared according to the invention are higher than those of the iron powder compositions prepared by reduction of the corresponding nonpretreated iron oxide or iron oxide hydrate compositions.

TABLE F

| Iron powder prepared from "oxide powder 1" which was pretreated with solution | $(\mu_o \cdot {}_iH_c)\times 10^4$ (in v. sec./m.$^2$) | $\sigma_r \times 10^4$ (in v. sec. m./kg.) |
|---|---|---|
| | 455 | 0.68 |
| "Sn-0.04" | 600 | 0.80 |
| "Sn-0.4" | 653 | 0.79 |

TABLE G

| Iron powder prepared from "oxide powder 1" which was pretreated with solution | $(\mu_o \cdot {}_iH_c)\times 10^4$ (in v. sec./m.$^2$) | $\sigma_r \times 10^4$ (in v. sec. m./kg.) |
|---|---|---|
| | 205 | 0.35 |
| "Sn-0.04" | 510 | 0.66 |
| "Sn-0.4" | 580 | 0.64 |

What is claimed is:

1. A method of preparing a magnetically stable powder consisting mainly of iron for magnetic recording comprising the steps of subjecting a finely divided iron compound selected from the group consisting of oxides and oxyhydrates of iron to the action of a 0.002 to 1 molar solution in water of stannous chloride, reducing the so-treated finely divided iron oxide or finely divided iron oxide hydrate with a gaseous reduction agent to iron powder and thereafter stabilizing the iron powder.

2. A method as claimed in claim 1, wherein hydrogen is the gaseous reduction agent.

3. A method as claimed in any of the claims 1 wherein the iron oxide and the iron oxide hydrate, before being reduced is treated with a 0.004 to 0.04 molar solution of stannous chloride in water.